(12) United States Patent
Zhou et al.

(10) Patent No.: US 8,916,244 B2
(45) Date of Patent: Dec. 23, 2014

(54) INKJET MEDIA AND METHOD THEREOF

(75) Inventors: Xiaoqi Zhou, San Diego, CA (US); Paul C Landrum, San Diego, CA (US); David Edmondson, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/238,820

(22) PCT Filed: Aug. 23, 2011

(86) PCT No.: PCT/US2011/048805
§ 371 (c)(1),
(2), (4) Date: Feb. 13, 2014

(87) PCT Pub. No.: WO2013/028176
PCT Pub. Date: Feb. 28, 2013

(65) Prior Publication Data
US 2014/0212603 A1    Jul. 31, 2014

(51) Int. Cl.
| | |
|---|---|
| *B41M 5/40* | (2006.01) |
| *B41M 5/50* | (2006.01) |
| *B05D 5/10* | (2006.01) |
| *B05D 5/04* | (2006.01) |
| *B32B 27/28* | (2006.01) |
| *B41M 5/52* | (2006.01) |
| *B05D 5/08* | (2006.01) |

(52) U.S. Cl.
CPC .............. *B41M 5/504* (2013.01); *B41M 5/506* (2013.01); *B05D 5/10* (2013.01); *B05D 5/04* (2013.01); *B32B 27/28* (2013.01); *B41M 5/5218* (2013.01); *B05D 5/08* (2013.01); *B41M 5/502* (2013.01); *B41M 5/508* (2013.01); *B41M 2205/34* (2013.01); *B41M 2205/36* (2013.01); *B41M 2205/38* (2013.01)

USPC .................. 428/32.22; 428/32.26; 428/32.34; 427/207.1; 427/209

(58) Field of Classification Search
CPC .............. B05D 5/04; B05D 5/08; B05D 5/10; B32B 27/28; B41M 5/504; B41M 5/508; B41M 5/502; B41M 5/5218; B41M 5/506
USPC .............. 428/32.22, 32.26, 32.34; 427/207.1, 427/209
See application file for complete search history.

(56) References Cited

U.S. PATENT DOCUMENTS

| | | | |
|---|---|---|---|
| 2003/0211293 | A1 | 11/2003 | Nemoto et al. |
| 2013/0171444 | A1* | 7/2013 | Cho et al. ........................ 428/323 |
| 2014/0212603 | A1* | 7/2014 | Zhou et al. .................. 428/32.22 |

FOREIGN PATENT DOCUMENTS

| | | |
|---|---|---|
| JP | 08-002092 A | 1/1996 |
| JP | 09-314711 A | 12/1997 |
| JP | 11-011010 A | 1/1999 |
| KR | 10-2010-0003444 A | 1/2010 |

OTHER PUBLICATIONS

PCT Search Report and Written Opinion—Application No. PCT/US2011/048805, dated Apr. 10, 2012, pp. 9.

* cited by examiner

*Primary Examiner* — Betelhem Shewareged
(74) *Attorney, Agent, or Firm* — Hewlett-Packard Patent Department; Victor DeVito

(57) ABSTRACT

An inkjet media includes a base substrate, an upper fluid barrier layer disposed on a side of the base substrate, a lower fluid barrier layer disposed on an other side of the base substrate, an image receiving layer disposed on the upper fluid barrier layer, a back adhesive layer disposed on the lower fluid barrier layer, an activation layer disposed on the back adhesive layer, an adhesive protection layer disposed on the activation layer.

15 Claims, 3 Drawing Sheets

INKJET MEDIA AND METHOD THEREOF

BACKGROUND

Inkjet media such as sheet media and web media may be used to receive images from inkjet printing systems. The images may be in a form of designs, symbols, photographs, and/or text. Such inkjet media may be in the form of wall paper, signs, banners, and the like. Inkjet media may include an adhesive layer to enable the media to be fixed to objects such as walls.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components, layers, substrates and features illustrated in the figures are chosen primarily for convenience and clarity of presentation and are not necessarily to scale. Referring to the attached figures:

Throughout the drawings, identical reference numbers designate similar, but not necessarily identical, elements.

DETAILED DESCRIPTION

Inkjet media such as sheet media or web media is used to receive images such as designs, symbols, photographs, and/or text from inkjet printing systems. The ink may be in a variety of forms including latex-based inks. Such inkjet media may include an adhesive layer such as a back adhesive layer opposite a side of the inkjet media in which images are formed thereon to enable it to be bonded (e.g., fixed) to objects such as walls, panels, frames, and the like. Such inkjet media may be in the form of wall paper, signage, banners, and the like. Generally, the inkjet media may have a non-adhesion state and an adhesion state. For example, in the non-adhesion state, the back adhesive layer may exhibit adhesion non-sticky property. Thus, the inkjet media may have images formed thereon and be readily transported. In the adhesion state, the back adhesive layer may exhibit good adhesion. Thus, the inkjet media, for example, with the images formed thereon, may be adhered to an object such as a wall. The inkjet media may be initially present as a non-adhesion state, but can be converted into the adhesion state by physical or chemical interactions in a certain environment, for example, when immersed in fluid such as water. Chemicals forming the adhesive layer, and the like, however, may make contact with the images formed on the inkjet media during installation processing in the water. The interaction between the images and, for example, the adhesion chemicals in contact therewith may degrade the image by contributing to image fading and a decrease in image durability.

In examples, an inkjet media includes a base substrate, an upper fluid barrier layer disposed on a side of the base substrate, a lower fluid barrier layer disposed on an other side of the base substrate, an image receiving layer disposed on the upper fluid barrier layer, a back adhesive layer disposed on the lower fluid barrier layer, and an activation layer disposed on the back adhesive layer. The inkjet media also includes an adhesive protection layer disposed on the activation layer. The back adhesive layer may be placed in an adhesion state when the inkjet media is immersed in fluid such as water. Thus, in the adhesion state, the inkjet media may be fixed to an object such as a wall. The adhesive protection layer may reduce transportation and/or contact of chemicals forming the back adhesive layer and the activation layer with the images formed on the inkjet media. Thus, the amount of chemicals from the back adhesive layer and the activation layer that contact the image, image degradation and a decrease in image durability is reduced.

Figure 1:
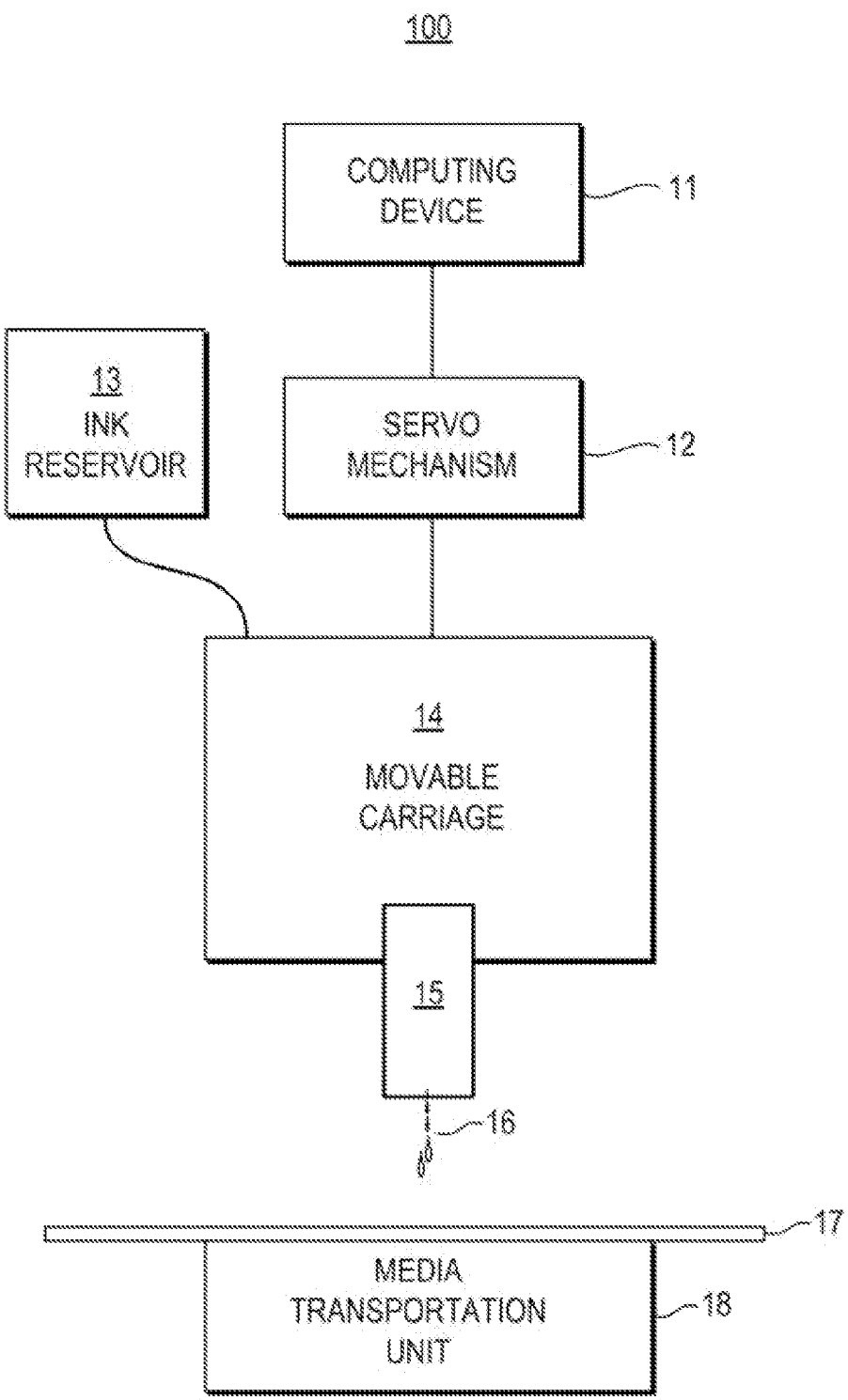
FIG. 1 is a schematic view illustrating an inkjet printing system and an inkjet media according to an example.

FIG. 1 is a schematic view illustrating an inkjet printing system and an inkjet media according to an example. Referring to FIG. 1, in some examples, an inkjet printing system 100 includes a computing device 11, an ink applicator unit 15, an ink reservoir 13, a movable carriage 14, a servo mechanism 12 and a media transportation unit 18. The computing device 11 may be controllably coupled through a servo mechanism 12 to a moveable carriage 14 having an inkjet applicator unit 15 such as an inkjet print head disposed thereon. The ink reservoir 13 may be coupled to the inkjet applicator unit 15 through the moveable carriage 14. The media transportation unit 18 may transport the inkjet media 17 toward and away from the inkjet applicator unit 15.

Referring to FIG. 1, in some examples, the computing device 11 may be controllably coupled to the servo mechanism 12 and may control the selective deposition of ink 16 such as latex-based ink on inkjet media 17. A representation of a desired image may be formed using a program hosted by the computing device 11. That representation may then be converted into servo instructions that control the servo mechanism 12, the movable carriage 14 and the inkjet applicator unit 15. The computing device 11 may be a workstation, a personal computer, a laptop, a digital camera, a personal digital assistant (PDA), or other processor-based devices. The moveable carriage 14 may include any number of inkjet applicator units 15 to dispense the ink 16 onto the inkjet media 17. The servo mechanism 12 may include a shaft system, a belt system, a chain system, and the like.

Referring to FIG. 1, in some examples, the computing device 11 may controllably position the moveable carriage 14 and the inkjet applicator unit 15 to selectively dispense ink 16 at predetermined locations on the inkjet media 1 to form images thereon. The ink reservoir 13 may store ink 18 and be in fluid communication with the inkjet applicator unit 15 to supply ink 18 thereto. In some examples, the media transportation unit 18, for example, may include rollers, belts, and the like, to transport and/or position inkjet media 17 with respect to the ink applicator unit 15 during a printing operation.

Figure 2:
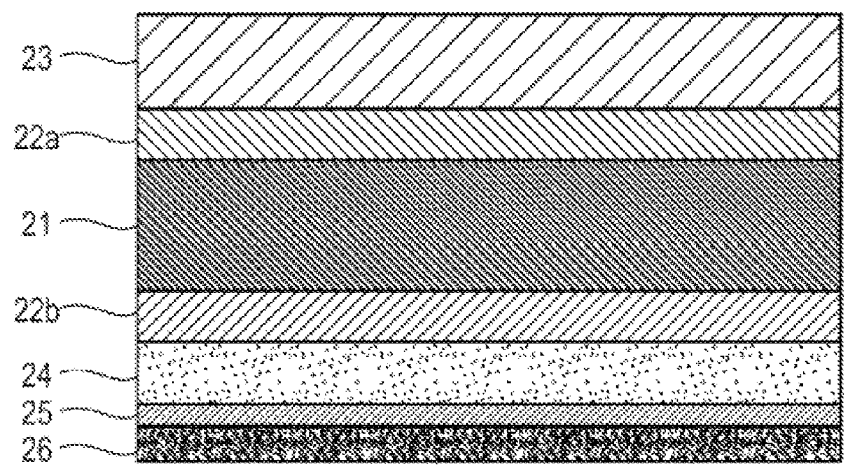
FIG. 2 is a cross-sectional view of inkjet media according to an example.

FIG. 2 is cross-sectional view of inkjet media according to an example. Referring to FIG. 2, in some examples, an inkjet media 17 includes a base substrate 21, an upper fluid barrier layer 22a disposed on a side of the base substrate 21, a lower fluid barrier layer 22b disposed on an other side of the base substrate 21, an image receiving layer 23 disposed on the upper fluid barrier layer 22a, a back adhesive layer 24 disposed on the lower fluid barrier layer 22b, an activation layer 25 disposed on the back adhesive layer 24, and an adhesive protection layer 26 disposed on the activation layer 25. In some examples, the respective fluid barrier layers 22a and 22b, the image receiving layer 23, the back adhesive layer 24, the activation layer 25, and the adhesive protection layer 26 disposed on the activation layer 25 may be in the form of coatings. In some examples, the image receiving layer 23 may be a single layer or, alternatively, a combination of single layers.

Figure 3:
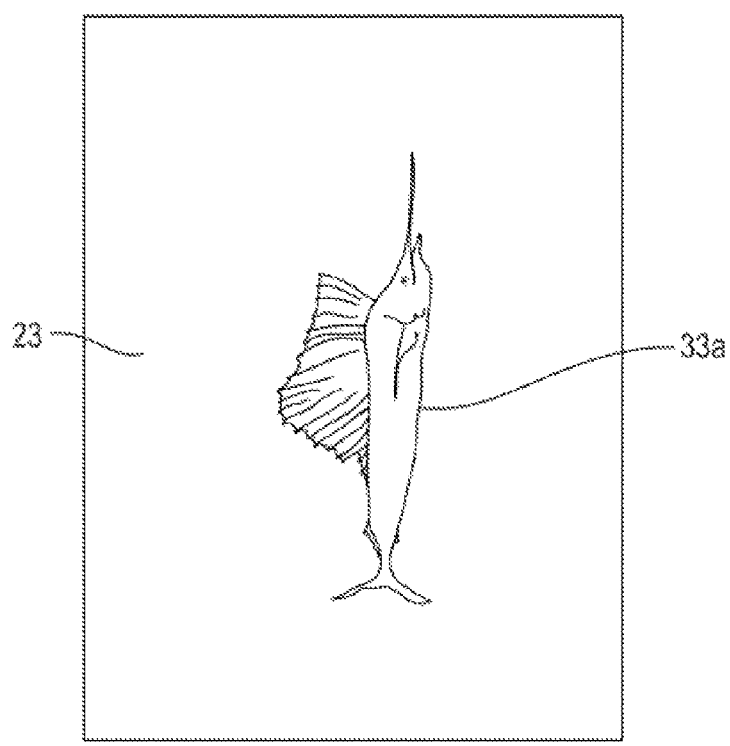
FIG. 3 is a top view of the inkjet media of FIG. 2 having an image formed thereon according to an example.

FIG. 3 is a top view of the inkjet media of FIG. 2 having an image formed thereon according to an example. Referring to FIGS. 2 and 3, in some examples, the upper and lower fluid barrier layers 22a and 22b may reduce penetration of fluid such as ink solvent into the base substrate 21. When the image receiving layer 23 is made up of a combination of single layers at least one of the respective layers may provide physical properties to the base substrate 21 such as smoothness, opacity, brightness, and whiteness. The Image receiving layer 23 may receive an image 33a thereon, for example, as illustrated in FIG. 3.

Referring to FIG. 3, the back-adhesive layer 24 may include a non-adhesion state and an adhesion state. In the non-adhesion state, for example, the back adhesive layer 24 may exhibit a non-sticky property. In the adhesion state, for example, the back, adhesive layer 24 may exhibit good adhesion. The activation layer 25 may promote the back adhesive layer 24 from a non-adhesion state into the adhesion state in response to an event condition such as at an elevated temperature condition in which the inkjet media exceeds a predetermined temperature and/or a welting condition such as high moisture thereof on the back adhesive layer 24. The wetting condition, for example, may be the inkjet media 17 being immersed in the fluid such as water. The adhesive protection layer 26 may block chemicals attacking from the back adhesive layer and the activation layer to the inks on the printed image. Thus, the adhesive protection layer 26 may reduce or block chemicals from the back adhesive layer 24 and the activation layer 25 that come in contact with the image 33a formed on the image receiving layer 23, for example, without adversely impacting adhesion strength and strippability property thereof. That is, in some examples, the adhesive protection layer 26 may allow the inkjet media 17 to be removed from an objective such as a wall without sustaining and/or imparting damage.

Base Substrate

In some examples, the base substrate 21 may include at least one of cellulose fibers, synthetic fibers, and a polymeric binder when non-cellulose fibers are used. For example, the base substrate 21 may include each one of cellulose fibers and synthetic fibers. In some examples, the base substrate 21 may include non-cellulose fibers. The cellulose fibers may be made from hardwood or softwood species. The ratio of hardwood to softwood fibers may range from 100:0 down to 50:50. The synthetic fibers may be made from polymerization of organic monomers. The synthetic fibers may include fibers formed from polyolefins, polyamides, polyesters, polyurethanes, polycarbonates, polyacrylics, and the like. For example, the base substrate 21 may also include synthetic polyolefin fibers such as polyethylene fibers, polyethylene copolymers fibers, polypropylene propylene copolymer fibers, and the like.

The polymeric binder may include water soluble polymers such as polyvinyl alcohol, starch derivatives, gelatin, cellulose derivatives, acrylamide polymers, and water-dispersible polymers such as acrylic polymers or copolymers, vinyl acetate latex, polyesters, vinylidene chloride latex, styrene-butadiene copolymer latex, acrylonitrile-butadiene copolymer latex, and the like. In some examples, the polymeric binders may be pre-mixed with the respective fibers. The polymeric binder may also include aqueous coupling agents.

Fluid Barrier Layers

In some examples, the upper fluid harrier layer 22a and the lower fluid barrier layer 22b may include a polymeric binder. In some examples, each one of the upper and lower fluid barrier layers 22a and 22b may include each one of the inorganic pigment and the polymeric binder. For example, a ratio of polymer binder to inorganic filters may range from 100:0 to 50:50, Additionally, a total amount of the respective polymer binder and inorganic pigment composition may be from 0.5 to 10 gram per square meter (gsm). In some examples, the polymeric binder may include water resistance and film-forming properties. For example, the polymeric binder may enable formation of a continuous film at room temperature and/or in a temperature range of about zero degrees Celsius to forty degrees Celsius. The polymeric binder may be in a form of aqueous polymeric dispersions having a self cross-linkable capability. That is, the functional groups in the respective polymeric chains such as carboxyl groups, hydroxyl groups, amine groups, epoxy groups, and the like can react with each other with reactive groups existing in the composition with or without using a reaction catalyst or promoter to promote cross-link reaction to form a larger molecular structure or three-dimensional cross-linked chain structure. The upper and lower fluid barrier layers 22a and 22b may also include other processing aids such as $P_H$ control agent, viscosity control agent and surfactant.

Image Receiving Layer

In some examples, the image receiving layer 23 may include at least one of an inorganic pigment, co-pigments, a polymeric binder, a latex film-forming agent, and an optical brightening agent. For example, the image receiving layer 23 may include each one of the inorganic pigment, the co-pigments, the polymeric binder, the latex film-forming agent, and the optical brightening agent. The co-pigments may include both organic pigments and inorganic pigments. The polymeric binder may bind pigments to each other and to the upper fluid barrier layer 22a. The image receiving layer 23 may also include other components and functional additives such as processing aids, color hue adjuster (dyes), optical brightness agents, biocides, and the like. In some examples, an image receiving layer 23 is formed over the upper barrier layer 22a. In some examples, the image receiving layer 23 may be a single layer or a combination of single layers. For example, the image receiving layer 23 may be an outermost layer to receive the ink 16 to form an image 33a thereon. The image receiving layer 23 may also absorb ink carrier fluid and stabilize colorant in the ink 16.

Back Adhesive Layer

In some examples, the back adhesive layer 24 may include at least one of a reactive polymer, a surfactant, and a deforming agent. For example, the back adhesive layer 24 may include each one of the reactive polymer, the surfactant, and the deforming agent. The polymer may include polymer/copolymer from acrylic acid; methacrylic acid and their derivatives; polymer/copolymer from hydrocolloids such as alginates, carrageenan, and the like, extracted from natural products such as seaweed; polymer/copolymer from hydroxyethylcellulose, and the like. In some examples, the back adhesive layer 24 may be made of three % to five % starch, cellulose or another polysaccharide with an amount of less than one % of polyvinyl acetate (PVA), or other latex-based adhesives. In some examples, the back adhesive layer 24 includes modified natural polymers, such as carboxymethyl cellulose, dextrin, starches, and the like.

In some examples, the back adhesive layer 24 includes carboxylated high molecular weight acrylic copolymers. In some examples, the polymers readily react with the activation layer 25 to place the back adhesive layer 24 in an adhesion state, for example, through chemical and/or physical cross-linking to establish a three-dimensional network chemically and/or physically by chain entanglement. The back adhesive layer 24 may also include inorganic fillers. In some examples, the back adhesive layer 24 may be in a form of a pre-applied water-activated adhesive layer. That is, the pre-applied water-activated adhesive layer may become activated when exposed to water such as being submerged in the water.

Activation Layer

In some examples, the activation layer 25 may include a water-soluble alkali compound. After applying activation alkali compound, a surface $P_H$ as measured by the method specified in TAPPI standard T529 om-99 of a media back side, which is opposite to a surface where the image is printed, may be less than 9. In some examples, the surface $P_H$ may be in a range of 7.5 to 8.5. The activation layer 25 may include sodium carbonate, sodium bicarbonate and/or sodium hydroxide, and the like. In some examples, the activation layer 25 may maintain the back adhesive layer 24 in a non-adhesion state when the inkjet media 17 is in a dry state and place the back adhesive layer 24 in an adhesion state when the inkjet media 17 is in a wet state.

Adhesive Protection Layer

In some examples, the adhesive protection layer 26 may include at least one adhesive protective agent with a moderate number average molecular weight equal to or greater than 1000 but less than 25000. Additionally, $P_H$ of the solution of adhesive protective agent may be pre-adjusted to neutral to slightly acidic value in the range of 6 to 7 using a week acid solution such as formic acid, acetic acid, and trichloracetic acid. Consequently, the adhesive protection layer 26 may have a surface $P_H$ as measured by the method specified in TAPPI standard T529 om-99, in a range from 6.5 to 7.5. The molecular chains of adhesive protective agent is stable in alkali condition where "stable" to that molecular chains that will not break under alkali attack, nor react with adhesive molecule or molecules of one adhesive protective agent itself. The molecules of one adhesive protective agent may have a property of latent water soluble, where "latent" refers to molecules that are not immediately dissolved when in contact with aqueous solvent like water. Additionally, molecules way have a property of non-permanent adhesion on applied objects such as walls, where permanent refers to molecules that may not work as an adhesive by providing adhesion force when the respective media is dried.

In some examples, the adhesive protection layer 26 may include at least one of an organic poly-acid, an organic poly-acid copolymer, an organic poly-acid salt, and an organic poly-acid copolymer salt. For example, the adhesive protection layer 26 may include each one of the organic poly-acid, the organic poly-acid copolymer, the organic poly-acid salt, and the organic poly-acid copolymer salt. The organic poly-acid and copolymer of organic poly-acid may include polyaclic acid, Poly(methacrylic acid), Poly(styrenesulfonic acid), Poly(vinyl phosphoric acid), Poly(ethylene/acrylic acid), Poly(2-hydroxyethyl methacrylate/methacrylic acid, Poly (acrylamide/acrylic acid), Poly(ethyl acrylate/acrylic acid), and the like. The respective salts may include sodium, potassium, ammonium salt, and the like.

In some examples, the adhesive protection layer 26 may include water soluble nitrogen including a polymer, a copolymer, a polymer salt, and a copolymer salt. The water soluble nitrogen including polymers, copolymers and their salts may include polyacrylamide, polymethacrylamide, Poly(N-isopropylacrylamide), Poly(N-vinylpyrrolidone), Poly(2-dimethylaminoethyl methacrylate), Poly(2-vinylpyridine), Poly (2-vinylpyridine N-oxide), Poly(N-vinylpyrrolidone/vinyl acetate), Poly(Allyl Amine), Poly(diallyldimethylammonium chloride), branched polyethylenimine, linear polyethylenimine, Poly(vinylamine) hydrochloride, Poly(2-vinyl-1-methylpyridinium bromide, Poly(2-methacryloxyethyltrimethylammonium bromide, Poly(3-chloro-2-hydroxypropyl-2-methacryloxyethyldimethylammonium chloride), Poly(n-butyl acrylate/2-methacryloxyethyltrimethylammonium bromide), and the like.

In some examples, the adhesive protection layer 26 may include water soluble oxygen including polymers and copolymers. The water soluble oxygen including polymers and copolymers may include Poly(ethylene glycol), Poly (ethylene glycol) monomethyl ether, Poly(ethylene glycol) α-2-aminoethyl, ω-methoxy, Poly(ethylene glycol) bis (2-aminoethyl), Poly(ethylene glycol)-bisphenol A diglycidyl ether adduct, Poly(ethylene oxide-b-propylene oxide), Poly(vinyl alcohol), Poly(vinyl methyl ether), Poly(2-ethyl-2-oxazoline), Poly(1-glycerol methacrylate, Poly(2-hydroxypropyl methacrylate), Poly(oxyethylene) sorbitan monolaurate (Tween 20), and the like.

In some examples, the adhesive protection layer 26 may include water soluble macromolecules. The water soluble macromolecules, for example, may be made from natural products. The water soluble macromolecules may include cellulose ethers, quaternized hydroxyethyl cellulose, linear polysaccharide, hydroxylcellulose, and the like.

Test Results

A printing test performed on test samples with a Hewlett-Packard Company (HP) Designjet L25500 printer using an HP latex ink corresponding to HP 789 ink cartridges and having a heating zone temperature set at fifty degrees Celsius, a cure zone temperature set at one hundred and ten degrees Celsius, and air flow set at fifteen percent. The test samples include a base substrate 21, an upper fluid barrier layer 22a disposed on one side of the base substrate 21, a lower fluid barrier layer 22b disposed on an other side of the base substrate 21, an image receiving layer 23 disposed on the upper fluid barrier layer 22a, an image 33a formed on the image receiving layer 23, a back adhesive layer 24 disposed on the lower fluid barrier layer 22b, an activation layer 25 disposed on the back adhesive layer 24, and an adhesive protection layer 28 disposed on the activation layer 25.

The test samples include 165 grammage paper (grams per square meter). For each one of the test samples, the respective fluid barrier layers 22a and 22b and image receiving layer 23 are coated using a lab Dow coater. The back adhesive layer 24 is made of Acrysol (from Rohm & Hass) having ten parts by weight of fine calcium carbonate filler over 100 parts of polymeric resin and a surfactant from BASF. Performance of the image and adhesive protection layer was evaluated by immersing the inkjet media 17 test samples having an image formed thereon into water for 2 minutes. Subsequently, the image formed on the image receiving layer 23 of the respective test sample was rubbed with a wet sponge and a shear force was applied to the image by scratching it using a striper. Thereafter, the condition of the rubbed and scratched image was visually inspected.

Table 1 illustrates formulation (in parts by weight) of the back protective layer 24 of the respective test sample in which polymers are listed (other components such as surfactant and deforming agent are not listed as such components are the same across the respective formulations). Table 2 illustrates test results.

TABLE 1

| | POLYVINAL ALCOHOL (Number average molecular weight = 15,000 AND DEGREE OF HYDROLYSIS = 72) | POLYETHYLENE-CO-ACRYLIC ACID (20% W/W) ACRYLIC ACID | POLYETHYLENE OXIDE (MASS WEIGHT (MW) = 1500) | METHYL CELLULOSE ETHER (MW = 2000 TO 3000) | POLYVINAL ALCOHOL (Number average molecular weight = 60,000 AND DEGREE OF HYDROLYSIS = 98) |
|---|---|---|---|---|---|
| EXPERIMENT ONE | 100 | | | | |
| EXPERIMENT TWO | | 100 | | | |
| EXPERIMENT THREE | | | 100 | | |
| EXPERIMENT FOUR | | | | 100 | |
| COMPARISON ONE | | | | | 100 |
| COMPARISON TWO (no protective layer) | | | | | |

TABLE 2

| EVALUATED PROPERTY | INK RUNNING | ADHESION STRENGTH | STRIPPABILITY | PASTE THINNING |
|---|---|---|---|---|
| EXPERIMENT ONE | ER = 5 | ER = 5 | ER = 4 | ER = 5 |
| EXPERIMENT TWO | ER = 5 | ER = 4 | ER = 4 | ER = 4 |
| EXPERIMENT THREE | ER = 4 | ER = 5 | ER = 4 | ER = 5 |
| EXPERIMENT FOUR | ER = 4 | ER = 4 | ER = 5 | ER = 5 |
| COMPARISON ONE | ER = 5 | ER = 5 | ER = 2 | ER = 5 |
| COMPARISON TWO | ER = 1 | ER = 5 | ER = 5 | ER = 4 |

With respect to Table 2 and the ink running evaluated property, the following ER values correspond as follows:
ER=5 corresponds to no visible ink running;
ER=4 corresponds to very minor ink running;
ER=3 corresponds to minor ink running within an acceptable level;
ER=2 corresponds to ink running at an unacceptable level; and
ER=1 corresponds to significant ink running at an unacceptable level.

With respect to Table 2 and the adhesion strength evaluated property, the following ER values correspond as follows:
ER=5 corresponds to media firmly placed on a glossy painted wall;
ER=4 corresponds to media placed firmly on a textured wall and placed on a glossy wall in an acceptable but not firm manner;
ER=3 corresponds to media placed on a glossy wall with minor air bubbles therebetween;
ER=2 corresponds to media placed on glossy wall with an occurrence of some delamination; and
ER=1 corresponds to media placed on glossy wall with lifting of edges over time and occurrence of delamination between middle portion of the media and the wall.

With respect to Table 2 and the strippability evaluated property, the following ER values correspond as follows:
ER=5 corresponds to easy removal of the media from the wall;
ER=4 corresponds to easy removal of the media from the wall with assistance from water at room temperature applied to the media;
ER=3 corresponds to removal of the media from the wall assisted with warm water applied to the media;
ER=2 corresponds to the media net readily removed from the wall; and
ER=1 corresponds to removal of the media from the wall with difficulty resulting in damage to wall surface after removal there from.

With respect to Table 2 and the paste thinning evaluated property, the following ER values correspond as follows:
ER=5 corresponds to paste showing strong thixtropic property and no paste running;
ER=4 corresponds to paste running along the wall and forming a paste streak thereon having a length of less than 2 inches;
ER=3 corresponds to the paste running along the wall and forming a paste streak having a length thereon between 4 to 6 inches;
ER=2 corresponds to the pasta running along the wall and forming a paste streak having a length of greater than 10 inches; and
ER=1 corresponds to the paste running along the wall in a manner similar to water.

Figure 4:
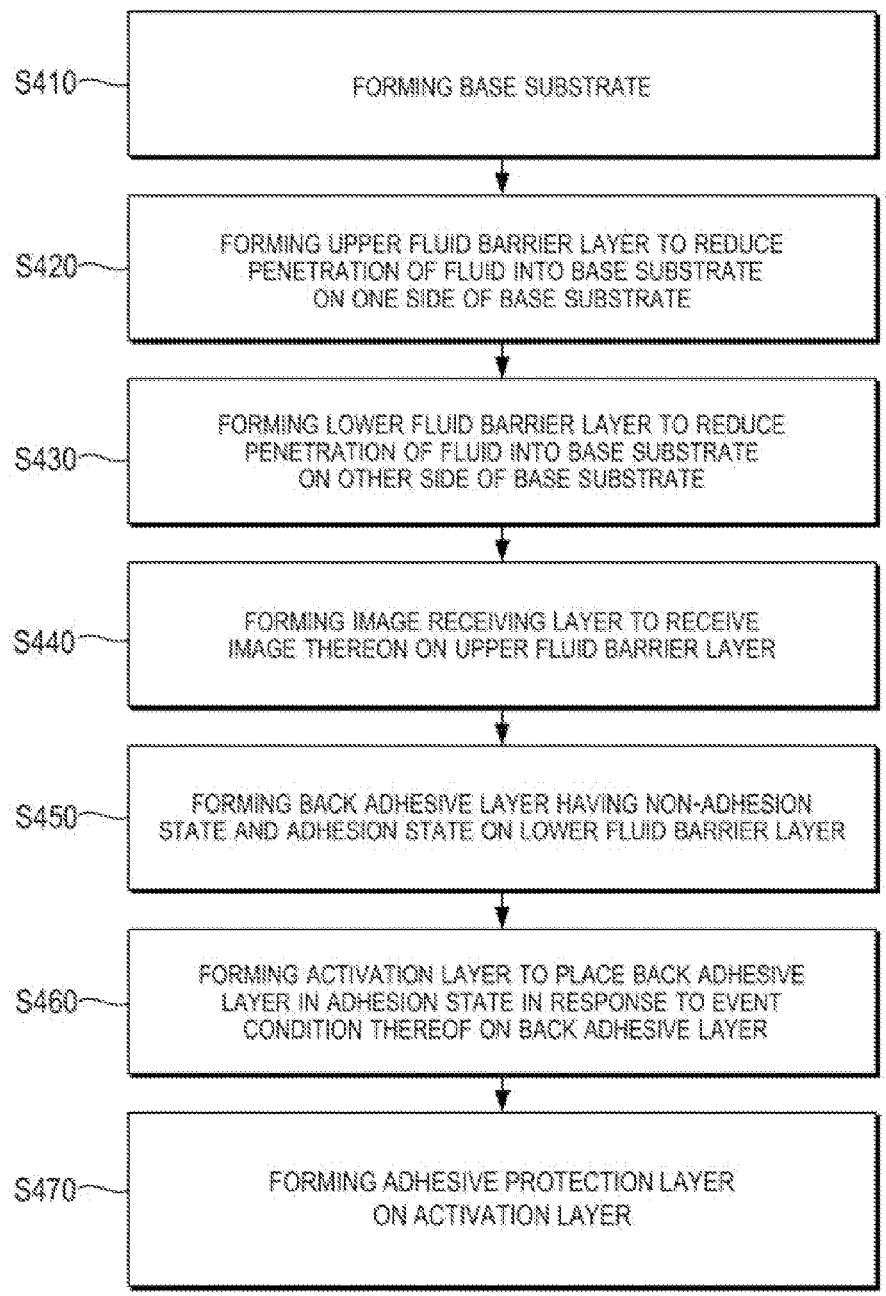
FIG. 4 is a flowchart illustrating a method of forming an inkjet media according to an example.

FIG. 4 is a flowchart illustrating a method of forming an inkjet media according to an example. Referring to FIG. 4, in block S410, a base substrate is formed. For example, the base substrate may be formed with a pilot paper machine with a pulp, and the like. In block S420, an upper fluid barrier layer to reduce penetration of fluid into the base substrate is formed on one side of the base substrate. The fluid, for example, may be water. In block S430, a lower fluid barrier layer to reduce penetration of the fluid into the base substrate is formed on an other side of the base substrate. For example, paper coating processes may be used to form the upper and lower fluid barrier layers such as forming the respective layers on-line with a paper machine surface sizing station, a rod metered paper coater, and the like. In block S440, an image receiving layer to receive an image thereon is formed on the upper fluid barrier layer. For example, the image receiving layer may be formed by a rod metered paper coater, and the like.

Referring to FIG. 4, in block S450, a back adhesive layer having a non-adhesion state and an adhesion state is formed on the lower fluid barrier layer. For example, the back adhesive layer may be formed by using coating methods such as size press, slot die, blade coating and Meyer rod coating, and the like. In block S460, an activation layer to place the back adhesive layer in an adhesion state in response to an event condition thereof is formed on the back adhesive layer. The event condition may be a wetting condition such as the inkjet media being immersed in the fluid such as water and/or an elevated temperature condition in which the inkjet media is heated above a predetermined temperature. The activation layer may be applied by a soaking bath, pre-coated by a metering device with an alkaline solution, and the like. In block S470, an adhesive protection layer is formed on the activation layer. In some examples, the adhesive protection layer may reduce contact of chemicals of the back adhesion layer and the activation layer with the images formed on the inkjet media during installation processing, for example, in water. For example, the adhesive protective layer may be formed by pond coating, rod coating blade coating, air-knife coating, curtain coating, and the like. In some examples, the coating weight ranges from 0.001 to 10 gsm such as in a range of 0.6 to 2 gsm.

It is to be understood that the flowchart of FIG. 4 illustrates architecture, functionality, and/or operation of an example of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 4 illustrates a specific order of execution, the order of execution may differ from that which is depicted. For example, the order of execution of two or more blocks may be scrambled relative to the order illustrated. Also, two or more blocks illustrated in succession in FIG. 4 may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. An inkjet media, comprising:
   a base substrate;
   an upper fluid barrier layer disposed on a side of the base substrate and a lower fluid barrier layer disposed on an other side of the base substrate, each one of the upper and lower barrier layers including at least one of an inorganic pigment and a polymeric binder;
   an image receiving layer disposed on the upper fluid barrier layer, the image receiving layer to receive an image and including at least one of an inorganic pigment, co-pigments, a polymeric binder, a latex film-forming agent, and an optical brightening agent;
   a back adhesive layer disposed on the lower fluid barrier layer, the back adhesive layer including at least one of a reactive polymer, a surfactant, and a deforming agent;
   an activation layer disposed on the back adhesive layer, the activation layer including a water-soluble alkali compound; and
   an adhesive protection layer disposed on the activation layer, the adhesive protection layer including at least one adhesive protective agent having a $P_H$ in a range of 6.5 to 7.5.

2. The inkjet media according to claim 1, wherein the back adhesive layer further comprises a non-adhesion state and an adhesion state.

3. The inkjet media according to claim 1, wherein the adhesive protection layer comprises at least one of an organic poly-acid, an organic poly-acid copolymer, an organic poly-acid salt, and an organic poly-acid copolymer salt.

4. The inkjet media according to claim 1, wherein the adhesive protection layer comprises the organic poly-acid, the organic poly-acid copolymer, the organic poly-acid salt, and the organic poly-acid copolymer salt.

5. The inkjet media according to claim 1, wherein the adhesive protection layer comprises water soluble nitrogen including a polymer, a copolymer, a polymer salt, and a copolymer salt.

6. The inkjet media according to claim 1, wherein the adhesive protection layer comprises water soluble oxygen including polymers and copolymers.

7. The inkjet media according to claim 1, wherein the adhesive protection layer comprises water soluble macromolecules.

8. The inkjet media according to claim 1, wherein the at least one adhesive protective agent of the adhesive protection layer comprises a moderate number average molecular weight in a range from 1000 to less than 25000.

9. The inkjet media according to claim 1, wherein the at least one adhesive protective agent comprises a latent water soluble property and a non-permanent adhesion property to applied objects.

10. The inkjet media according to claim 1, wherein the image receiving layer comprises the inorganic pigment, the co-pigments, the polymeric binder, the latex film-forming agent, and the optical brightening agent.

11. The inkjet media according to claim 1, wherein the back adhesive layer comprises the reactive polymer, the surfactant, and the deforming agent.

12. An inkjet media, comprising:
    a base substrate;
    an upper fluid barrier layer disposed on a side of the base substrate and a lower fluid barrier layer disposed on an other side of the base substrate, each one of the upper and lower barrier layers including a polymeric binder;
    an image receiving layer disposed on the upper fluid barrier layer, the image receiving layer to receive an image and including an inorganic pigment, co-pigments, a polymeric binder, a latex film-forming agent, and an optical brightening agent;
    a back adhesive layer disposed on the lower fluid barrier layer, the back adhesive layer including a reactive polymer, a surfactant and a deforming agent;

an activation layer disposed on the back adhesive layer, the activation layer including a water-soluble alkali compound; and an adhesive protection layer disposed on the activation layer, the adhesive protection layer including at least one of water soluble nitrogen, water soluble oxygen, water soluble macromolecules, and a combination of an organic poly-acid, an organic poly-acid copolymer, an organic poly-acid salt, and an organic poly-acid copolymer salt.

13. A method of forming an inkjet media, the comprising:

forming a base substrate;

forming an upper fluid barrier layer to reduce penetration of fluid into the base substrate on one side of the base substrate;

forming a lower fluid barrier layer to reduce penetration of the fluid into the base substrate on an other side of the base substrate;

forming an image receiving layer to receive an image thereon on the upper fluid barrier layer;

forming a back adhesive layer having a non-adhesion state and an adhesion state on the lower fluid barrier layer;

forming an activation layer to place the back adhesive layer in an adhesion state in response to an event condition thereof on the back adhesive layer; and forming an adhesive protection layer on the activation layer.

14. The method according to claim 13, wherein the forming an adhesive protection layer further comprises:

pre-adjusting $P_H$ of a solution of an adhesive protective agent in a range of 6 to 7 using a weak acid solution to form the adhesive protection layer having a surface $P_H$ in a range from 6.5 to 7.5.

15. The method according to claim 13, wherein the event condition corresponds to a wetting condition.

* * * * *